US009460223B2

(12) United States Patent
Szalai et al.

(10) Patent No.: US 9,460,223 B2
(45) Date of Patent: *Oct. 4, 2016

(54) SYSTEM, METHOD, AND COMPUTER PROGRAM PRODUCT FOR MANAGEMENT OF WEB PAGE LINKS

(71) Applicant: International Business Machines Corporation, Armonk, NY (US)

(72) Inventors: Zsolt Szalai, Tourrettes-sur-Loup (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/622,317

(22) Filed: Feb. 13, 2015

(65) Prior Publication Data
US 2015/0154311 A1 Jun. 4, 2015

Related U.S. Application Data

(63) Continuation of application No. 13/164,994, filed on Jun. 21, 2011, now Pat. No. 8,996,977.

(30) Foreign Application Priority Data

Dec. 10, 2010 (EP) ..................... 10306396

(51) Int. Cl.
*G06F 17/00* (2006.01)
*G06F 17/30* (2006.01)
*H04L 29/08* (2006.01)

(52) U.S. Cl.
CPC ..... *G06F 17/30887* (2013.01); *G06F 17/3089* (2013.01); *H04L 67/02* (2013.01)

(58) Field of Classification Search
CPC .......... G06F 17/2235; G06F 17/2241; G06F 17/30014
USPC ......................... 715/205–208, 224
See application file for complete search history.

(56) References Cited

U.S. PATENT DOCUMENTS 6,253,204 B1 6/2001 Glass et al.
6,578,078 B1 6/2003 Smith et al.
(Continued)

FOREIGN PATENT DOCUMENTS

EP 1320040 A2 6/2003

OTHER PUBLICATIONS

Cortes, Howard, FR920100047US1, U.S. Appl. No. 13/164,994 Notice of Allowance, Nov. 21, 2014, 14 pages.
(Continued)

*Primary Examiner* — Scott Baderman
*Assistant Examiner* — Howard Cortes
(74) *Attorney, Agent, or Firm* — Daniel Simek; Hoffman Warnick LLC (57) ABSTRACT

Systems, methods and computer program products for the management of web pages links are disclosed. A method can include, by detecting a broken link event to reach a web page, retrieving within a database of referenced web pages, a referenced identifier of the web page. By using the retrieved referenced identifier, identifying within a database of referencing web pages, zero or more page identifiers identifying zero or more web pages imbedding the broken link. Then, by using each retrieved web page identifier, identifying within a database of web sites, one or more web site identifiers, and generating a broken link notification for each retrieved web site identifier.

20 Claims, 5 Drawing Sheets

(56) References Cited

U.S. PATENT DOCUMENTS

| | | |
|---|---|---|
| 6,606,653 B1 | 8/2003 | Ackermann, Jr. et al. |
| 6,785,864 B1 | 8/2004 | Te et al. |
| 6,895,551 B1 | 5/2005 | Huang et al. |
| 7,100,109 B1 | 8/2006 | Chartier |
| 7,392,303 B2 | 6/2008 | Smith et al. |
| 7,464,326 B2 | 12/2008 | Kawai et al. |
| 7,689,667 B2 | 3/2010 | Lal |
| 8,001,533 B2 | 8/2011 | Sturov |
| 8,135,705 B2 | 3/2012 | Beynon et al. |
| 8,392,576 B1 | 3/2013 | Henderson |
| 2003/0158953 A1 | 8/2003 | Lal |
| 2004/0024848 A1 | 2/2004 | Smith et al. |
| 2004/0205076 A1 | 10/2004 | Huang et al. |
| 2004/0216084 A1 | 10/2004 | Brown et al. |
| 2007/0067418 A1 | 3/2007 | Isaacs et al. |
| 2007/0168938 A1 | 7/2007 | Sturov |
| 2008/0263193 A1 | 10/2008 | Chalemin et al. |
| 2008/0270407 A1 | 10/2008 | Desai et al. |
| 2011/0153631 A1 | 6/2011 | Kondasani |
| 2012/0151323 A1 | 6/2012 | Szalai et al. |

OTHER PUBLICATIONS

Cortes, Howard, FR920100047US1, U.S. Appl. No. 13/164,994 Final Office Action, Mar. 29, 2013, 21 pages.

Cortes, Howard, FR920100047US1, U.S. Appl. No. 13/164,994 Non-Final Office Action, Sep. 19, 2012, 16 pages.

Ciard Pathways to Research Uptake, Group 2: Collection and Preservation, Maintaining web links and managing broken links, Version 0.1, Oct. 2009, 2 pages.

SYSTEM, METHOD, AND COMPUTER PROGRAM PRODUCT FOR MANAGEMENT OF WEB PAGE LINKS

PRIORITY CLAIM

This application is a continuation of, and claims priority to, co-pending U.S. patent application Ser. No. 13/164,994 filed on Jun. 21, 2011, which is hereby incorporated by reference in its entirety.

TECHNICAL FIELD

The present invention relates generally to the field of computer managed communication networks, and more particularly to a system and method for the management of hypertext links embedded in web pages.

BACKGROUND

The World Wide Web ("web") is a system of server computers on the Internet that support the standards defining both the structure of a web page and the protocol for passing information between client and server computers. Web pages are created using a so-called Structured Generalized Markup Language ("SGML"), such as HyperText Markup Language ("HTML") or Extensible Markup Language ("XML"), to structure the presentation of the text, graphics, audio, and video content of a web page. The textual content of a web page includes hypertext links embedded in the document text to allow the reader to click on the hypertext link in the document text to quickly access another, related, resource on the web. In addition, a software development environment and programming language such as JavaScript or Java may be used to create and modify programs called from the web page HTML code. A web page author first creates or modifies a web page and then publishes the web page on a web site to make it accessible to web users.

The web and HTML make it relatively easy for a web page author to create and update a web page. This not only promotes the proliferation of information on the web, but also increases the risk that a hypertext link in a web page may be altered improperly.

Web pages are frequently set up and designed in an eclectic manner. Often, there is insufficient provision made for embedded links or hotspots in such web pages that link to target web pages which no longer exist or that have been moved and are reachable at a new Uniform Resource Locator ("URL"). This could potentially lead to chaotic web browsing as the user wastes time going up blind alleys.

In addition, a web page author cannot guarantee that a web resource referenced by the web page is correct and still accessible via the hypertext link. A web page that contains out-of-date links is useless to the web page user and causes the user to either continue examining other links in the search result set, perform a new search, or abandon the search altogether. To a user of the web, the web page content and the accuracy of the embedded hypertext links determine the reliability of both the web page and the hosting web site.

Proper management of a web site demands periodic testing of every web page associated with the site by following every link on the web page to test the validity and reliability of the link. The responsibility for this testing falls upon a web site manager. The web site manager typically determines the frequency of the link testing (e.g., once a month), but relies upon either the web page author, or someone hired by the author, to update the content, examine the hypertext links, and correct any errors. Since this testing requires a considerable amount of time, the cost to assure that a web site's links are up-to-date will increase in proportion to the number of links available on the web site. Though the number of accessible web sites will continue to increase, a similar increase in the existence of accessible and inaccessible web pages will likely result. In addition, the manual nature of the link checking process described above is highly prone to error.

Web site management software exists, as disclosed, for example, in U.S. 2004/0205076, which can detect a change in hypertext links embedded in a web page and can notify the author of such change.

However, such web site management software still places on the author the task to update afterward the modified hypertext links which then limits the speed, growth, and efficiency of the web.

SUMMARY

The present invention addresses the problems described above by dynamically updating the links embedded in web pages, and in any other web pages having similar references.

Accordingly, the present invention provides a system and a method for automatically updating links embedded in web pages, thereby improving the quality and reliability of web sites.

The present invention further provides an automated web site management system and method for increasing the accuracy of the hypertext link information in a web page, as well as the accuracy of the content of web sites, thereby increasing the efficiency of users searching the web.

An aspect of the present invention provides a method of managing web page links in a computer network, comprising: upon detecting a broken link event to reach a web page, retrieving within a database of referenced web pages a referenced identifier of the web page; using the retrieved referenced identifier to identify within a database of referencing web pages zero or more page identifiers, the zero or more page identifiers identifying zero or more web pages imbedding the broken link; using each retrieved web page identifier for identifying within a database of web sites one or more web site identifiers; and generating a broken link notification for each retrieved web site identifier.

In another aspect of the present invention, a computer program product that includes a computer-readable storage medium having embedded computer usable program code is provided. The computer-usable program code can be configured to operate the method of the appended method claims when executed by a computer system.

Another aspect of the disclosure includes: in a computer network, a method of managing web page links, the computer network including: a lifecycle managing server that maintains a database, the database including a table of referencing web pages, a table of referenced web pages, and a table of web sites; and a plurality of web servers, each of the plurality of web servers operating a lifecycle client; the method including: upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page; using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link; using each retrieved identifier of the web page for automatically identifying, by the lifecycle managing server, from the table of web sites in the database of the lifecycle managing server, one or more web site identifiers; and generating and automatically sending, by the lifecycle managing server, a broken link notification for each retrieved web site identifier to all of the lifecycle clients of the plurality of web servers in the computer network.

Another aspect of the disclosure includes a system, having: at least one computing device configured to manage web page links in a computer network, the computer network including: a lifecycle managing server that maintains a database, the database including a table of referencing web pages, a table of referenced web pages, and a table of web sites; and a plurality of web servers, each of the plurality of web servers operating a lifecycle client, by performing actions including: upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page; using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link; using each retrieved identifier of the web page for automatically identifying, by the lifecycle managing server, from the table of web sites in the database of the lifecycle managing server, one or more web site identifiers; and generating and automatically sending, by the lifecycle managing server, a broken link notification for each retrieved web site identifier to all of the lifecycle clients of the plurality of web servers in the computer network.

Another aspect of the disclosure includes a computer program product stored on a non-transitory computer readable medium, which when executed by a computing device, manages web page links in a computer network, the computer network including: a lifecycle managing server that maintains a database, the database including a table of referencing web pages, a table of referenced web pages, and a table of web sites; and a plurality of web servers, each of the plurality of web servers operating a lifecycle client, by performing actions including: upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page; using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link; using each retrieved identifier of the web page for automatically identifying, by the lifecycle managing server, from the table of web sites in the database of the lifecycle managing server, one or more web site identifiers; and generating and automatically sending, by the lifecycle managing server, a broken link notification for each retrieved web site identifier to all of the lifecycle clients of the plurality of web servers in the computer network.

Further aspects of the disclosure will now be described, by way of implementation and examples, with reference to the accompanying figures.

BRIEF DESCRIPTION OF THE DRAWINGS

The above and other items, features and advantages of the invention will be better understood by reading the following more particular description of the invention in conjunction with the figures.

DETAILED DESCRIPTION OF THE INVENTION

Embodiments of the invention are described hereinafter by way of examples with reference to the accompanying figures and drawings.

Figure 1:
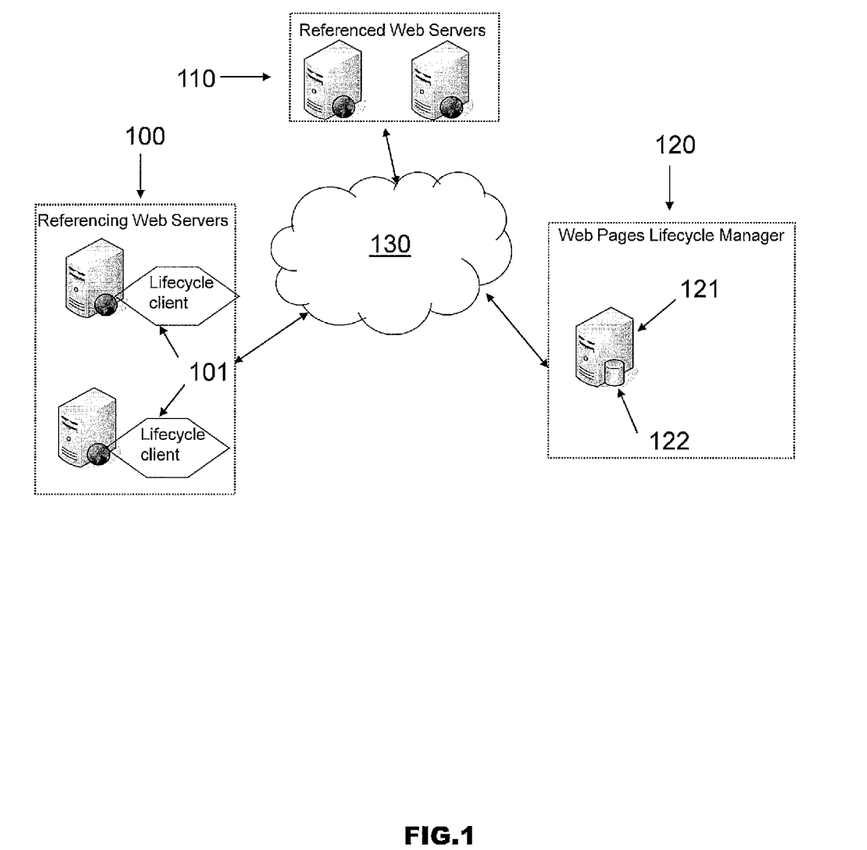
FIG. 1 is a schematic diagram depicting an illustrative system environment in accordance with an embodiment.

FIG. 1 is a schematic diagram depicting an illustrative system environment in accordance with an embodiment. A plurality of referencing web servers 100 are connected with a plurality of referenced web servers 110 through a network 130, such as the Internet. The referenced web servers 110 expose web pages linked to by web pages in the referencing web servers 100. The referencing web servers 100 expose web pages that contain hypertext links to web pages exposed by the referenced web servers 110. A web pages lifecycle manager component 120 is coupled to the referenced web servers 110 and to the referencing web servers 100.

For clarity of the description, the resources (referencing web servers 100, referenced web servers 110, and web pages lifecycle manager 120) are represented and described as being of one type only. However, it is to be appreciated that the resources can belong to one or several categories.

The referencing web servers 100 provide web pages that contain hypertext links. The hypertext links refer to further web pages provided by the referenced web servers 110. A referencing web server 100 contains a lifecycle client 101. For the purpose of this description, the lifecycle clients 101 are represented in association with only the referencing web servers 100. In another embodiment, the lifecycle clients 101 are also available with the referenced web servers 110.

Each web site includes a lifecycle client 101. The lifecycle client 101 becomes active when a web page is created, modified, or retired within a web site under the control of the lifecycle client component 101, or when a notification related to such a web page is received. The lifecycle client 101 fulfills several main functions, and supports the registration by web page authors within the web pages lifecycle manager 120.

In an embodiment, the registration comprises storing a unique identifier provided by the web pages lifecycle manager 120 and using this identifier for all communications with the web pages lifecycle manager 120. Further, the lifecycle client 101 communicates to the web pages lifecycle Manager 120: the addresses of the web pages exposed by the web servers within its control area; the hypertext links that such web pages imbed; and any modification to previously communicated information. The lifecycle client 101 is in an automated communication with the lifecycle manager 120 to provide new web pages within a web site, with URLs referenced in those web pages. Such communication may include any modifications to previously sent information, including but not limited to the deletion of previously declared web pages.

A lifecycle client 101, which receives notifications from the web pages lifecycle manager 120 of unavailable referenced URLs, automatically processes the information received, which can include but is not limited to a marking in the referencing web page of the referenced link as unavailable, or the replacement of the URL associated with the referencing hypertext link by a new URL, if such URL was communicated by the web pages lifecycle manager 120 in its notification.

The lifecycle Client 101 also receives notifications from the web pages lifecycle manager 120 of dead links referenced within its control area, so that it can initiate corrective action such as alerting the author of the web page, and automatically updating the imbedded hypertext link. Automatic updating of the hypertext link can take the form of a substitution by a different address if the notification from the web pages lifecycle manager 120 references a replacement link. At the least, automatic updating takes the form of a temporary marking that indicates that the target web page is unavailable.

The web pages lifecycle manager component 120 includes a lifecycle manager server 121, which maintains a database 122 with all the information communicated by the lifecycle clients 101. An embodiment of a database schema is further described with reference to FIG. 2. The lifecycle manager server 121 assigns a unique identifier (Site_ID) to each new lifecycle client 101 that registers with the lifecycle manager server 121. The person skilled in the art will easily appreciate that registration can be performed within a direct communication between the lifecycle client 101 and the web pages lifecycle manager 120, or outside of that communication, using means such as a sign-up on a web site or e-mail.

In an embodiment, all referenced web servers 110 and referencing web servers 100 implement the lifecycle client 101 function. Referencing web servers 100 that run the lifecycle client 101 function, pro-actively notify the web pages lifecycle manager 120 when they retire a web page or modify its address. For referenced web servers 110 that do not implement the lifecycle client 101 function, the web pages lifecycle manager 120 obtains the information that referenced web pages have become unavailable by regularly checking the availability of such referenced web pages. Upon detection of changes to referenced web pages, the lifecycle manager server 121 uses the information from its database 122 to identify all the lifecycle clients 101 that are impacted by the changes and notifies them automatically of such changes.

Figure 2:
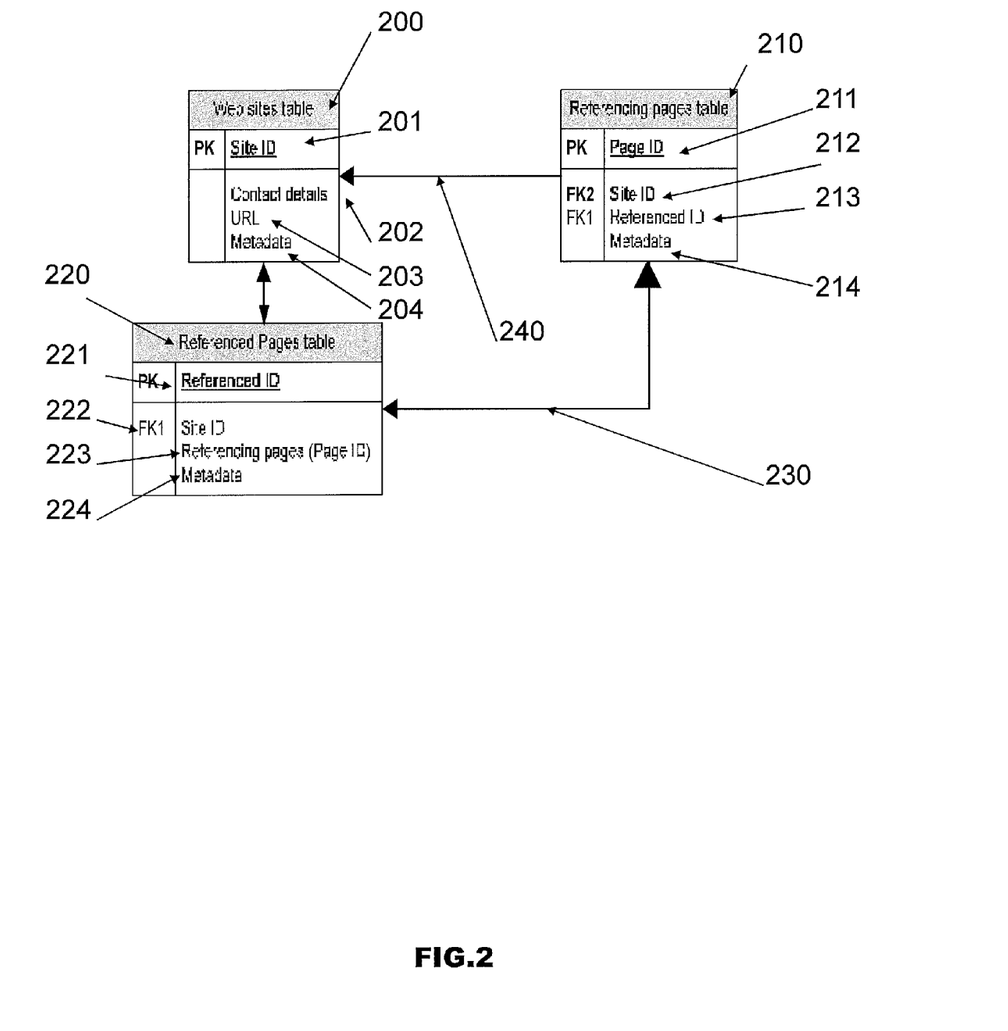
FIG. 2 shows a schema of an illustrative lifecycle manager database according to an embodiment.

Referring now to FIG. 2, an illustration of the lifecycle manager database 122 according to an embodiment is described. The database 122 comprises three tables 200, 210, 220 indexed each by a primary key (PK) and linked with the other tables through foreign keys (FK).

The web sites table 200 contains a list of the web sites exposed by the referencing web servers 100 or referenced web servers 110. The primary key (PK) of the web sites table 200 is a site identifier (Site_ID) 201, which is an identifier generated uniquely by the web pages lifecycle manager 120 for each registering web site. In an embodiment, registration occurs directly from a lifecycle client 101. Alternatively, for example in the case of referenced web servers 110 that do not implement the lifecycle client 101 function registration occurs manually, for example using an E-mail address or a registration web page, or any other means supported by the web pages lifecycle manager 120. At the minimum, the attributes of the web sites table 200 include the contact details 202 for the registering web site and its owner or webmaster, as well as the Uniform Resource Locator (URL) 203 of the index page of the web site.

The referencing pages table 210 includes a page identifier (Page_ID) 211 primary key (PK), which uniquely indexes each web page declared by a lifecycle client 101. Each Page_ID 211 is associated with one unique Site_ID 212 under a (primary key-foreign key) relationship 240. One Site_ID 212 is associated with zero or more Page_ID 211. The referencing pages table 210 further contains, under each Page_ID 211, a list 213 of web pages on referenced web servers 110 to which the web page contains hypertext links;

The referenced pages table 220 is populated dynamically from the web sites table 200 and the referencing pages table 210. One entry, under primary key (PK) Referenced_ID 221 is created by the lifecycle manager server 121 for each newly identified referenced web page in the referencing pages table 210. The URL field 203 is looked up in the web sites table 200. If no match is found, an exception is raised. In an embodiment, the exception message is raised to the attention of the administrator of the web pages lifecycle manager 120 who can identify and contact the owner of the referenced page to propose registration. If a match is found, the corresponding Site_ID 201 is copied to the server owner field 222. Further, the Page_ID 221 of the referencing page is copied into the referencing pages field 223. For references to the same web page subsequently entered in the referencing rages table 210, the Page_ID 211 of this new referencing page is added to the list of referencing pages 223. Changes to the web sites table 200 and referencing pages table 210, for example the deletion of references, are reflected in the referenced pages table 220 by the lifecycle manager server 121.

Additional fields 204, 214, 224 may be part of the tables to contain metadata.

Figure 3:
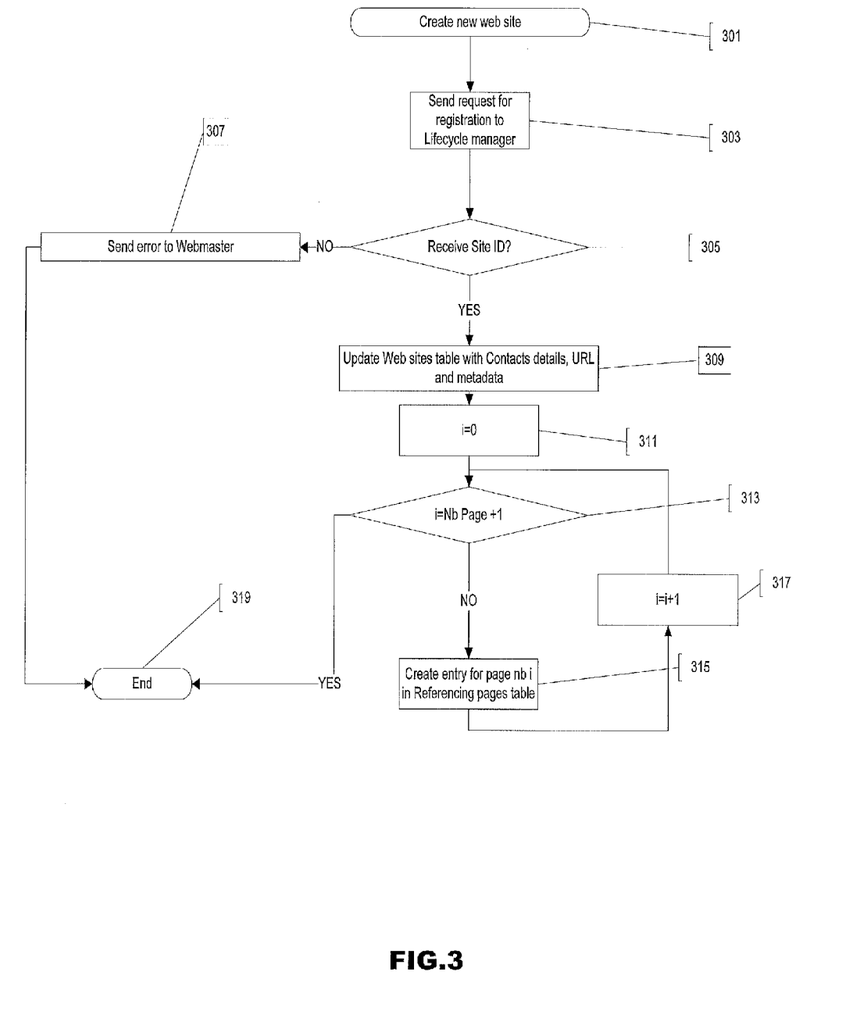
FIG. 3 is a flow chart detailing an illustrative process for registering a new web site according to an embodiment.

FIG. 3 depicts a high level flow chart of a process executed at web site creation for referencing a web site client according to an embodiment of the present invention. Processing starts at step 301 at the lifecycle client 101 when the webmaster of a web site on a referencing web server 100 makes it available on the world wide web. At step 303, a request is sent from a lifecycle client 101 of a web client to the web pages lifecycle manager 120 for registration of a new web site.

Next step 305 checks if in return to the request of step 303 a lifecycle client identifier (Site_ID 201) is received or not from the web pages lifecycle manager 120. If the identifier is received (branch Yes), then the process continues to step 309.

At step 309, the lifecycle client 101 sends attributes to the web pages lifecycle manager 120 to update the corresponding fields of the web site table 200. The attributes contains at least: contact means 202 and Uniform Resource Locator (URL) 203 of the index page of the new web site on the referencing web server 100. It is to be appreciated that contact means (e.g., an e-mail address) and URL may not be the only information to be included in a web site table 200 and that additional information may be defined (e.g., metadata 204) without departing from the scope of the invention.

After step 309, the process enters a loop at step 311 by setting a page counter (i set to 0). Next step 313 tests the value of the counter. If the counter is equal to the number of pages of the web site+1 (branch YES), the process ends at step 319, otherwise the process continues to step 315 and loops back.

At step 315 a new entry is created into the referencing pages table 210 to register the page number i of the created web site, and lists under this entry all possible links to referenced web servers 110.

At step 317, the page counter is incremented and the process returns to step 313.

Going back to step 305, if the lifecycle client identifier (Site_ID) is not received (Branch NO), the process informs the webmaster of the failure in registration at step 307, and the process ends at step 319.

Figure 4:
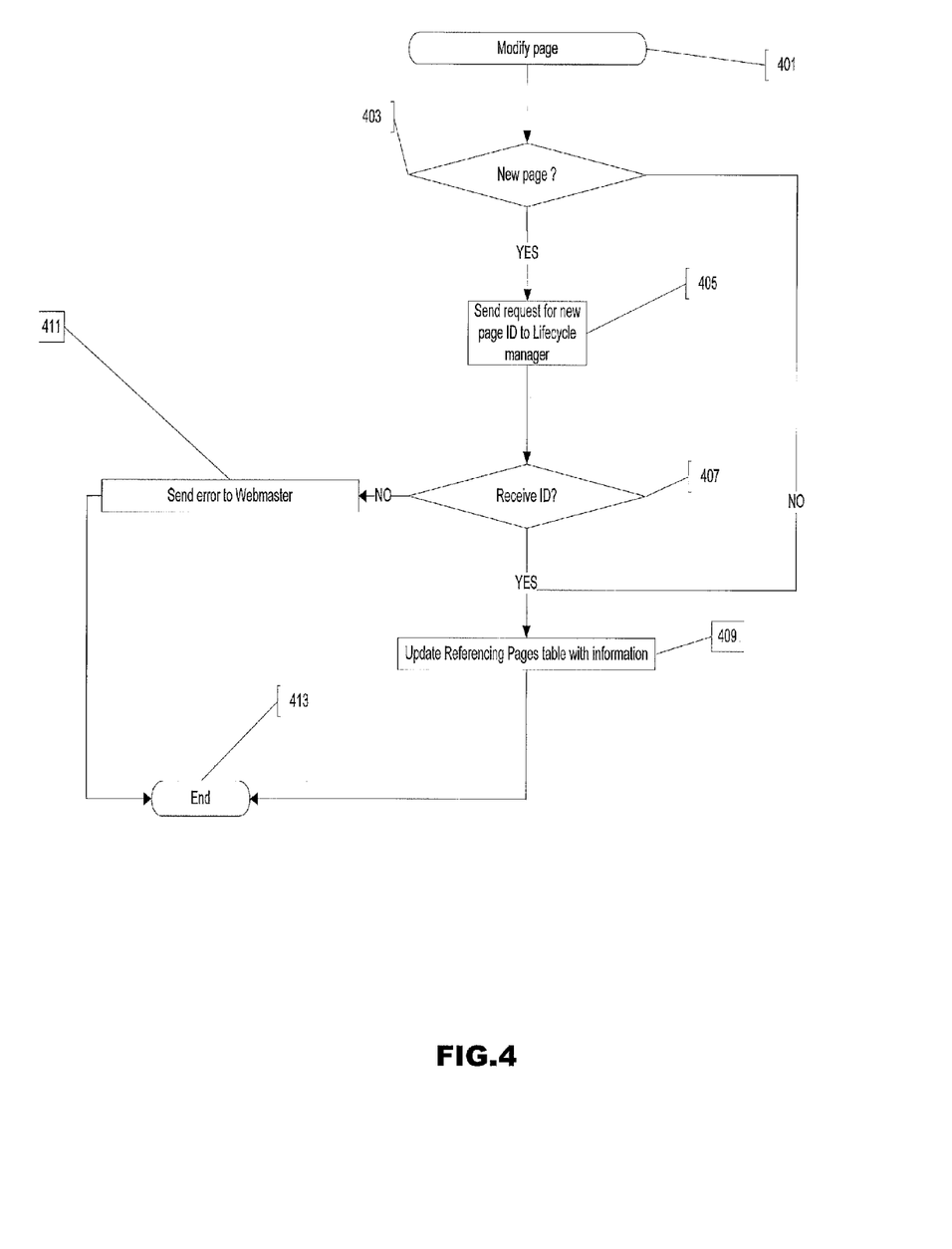
FIG. 4 is a flow chart detailing an illustrative process for updating web page tables according to an embodiment.

FIG. 4 shows a process 400 for updating the referencing pages table 210 according to an embodiment of the present invention. The process starts at step 401 when a modification event is detected by the lifecycle client 101. At step 403, the lifecycle client 101 determines if the modification event corresponds to changes of an existing page or to the creation of a new page.

If the modification applies to an existing page (branch No), then the process goes to step 409. At step 409, the lifecycle client 101 sends an update notification to the web pages lifecycle manager 120 requesting to update the corresponding entries in the referencing pages table 210. The update can pertain to:

A) The list of Uniform Resource Locators (URLs) to referenced web servers 110 that the modified page links to through its imbedded hypertext links. In this case, the web pages lifecycle manager 120 needs to update the list of referenced links in the referencing pages table 210;
B) The URL of the modified page itself. In this case, the web pages lifecycle manager 120 substitutes the previously registered URL for the new URL;
C) The deletion of one page or more from the web site. In this case, the web pages lifecycle manager 120 needs to delete the corresponding entries in the referencing pages table 210; and
D) The deletion of the web site. In this case, the web pages lifecycle manager 120 initiates a general cleanup of all the information contains in its database 122 related to the deleted web site.

The process then ends on step 413.

Going back to step 403, if the modifications are the creation of a new web page (Branch Yes), then the process goes to step 405. At step 405, a request is sent to the lifecycle manager server 102 for new web page registration.

Next step 407 checks if in return to the request of step 405 a page identifier (Page_ID) is received or not. If the identifier is received with the request (Branch Yes), then the process continues to step 409 where the lifecycle client 101 sends an update notification to the web pages lifecycle manager 120 with the information of the new web page. The process ends on next step 413.

Going back to step 407, if the lifecycle client Identifier (ID) 208 is not received (branch NO), the process informs the webmaster of the failure in registration at step 411, and the process ends on step 413.

Figure 5:
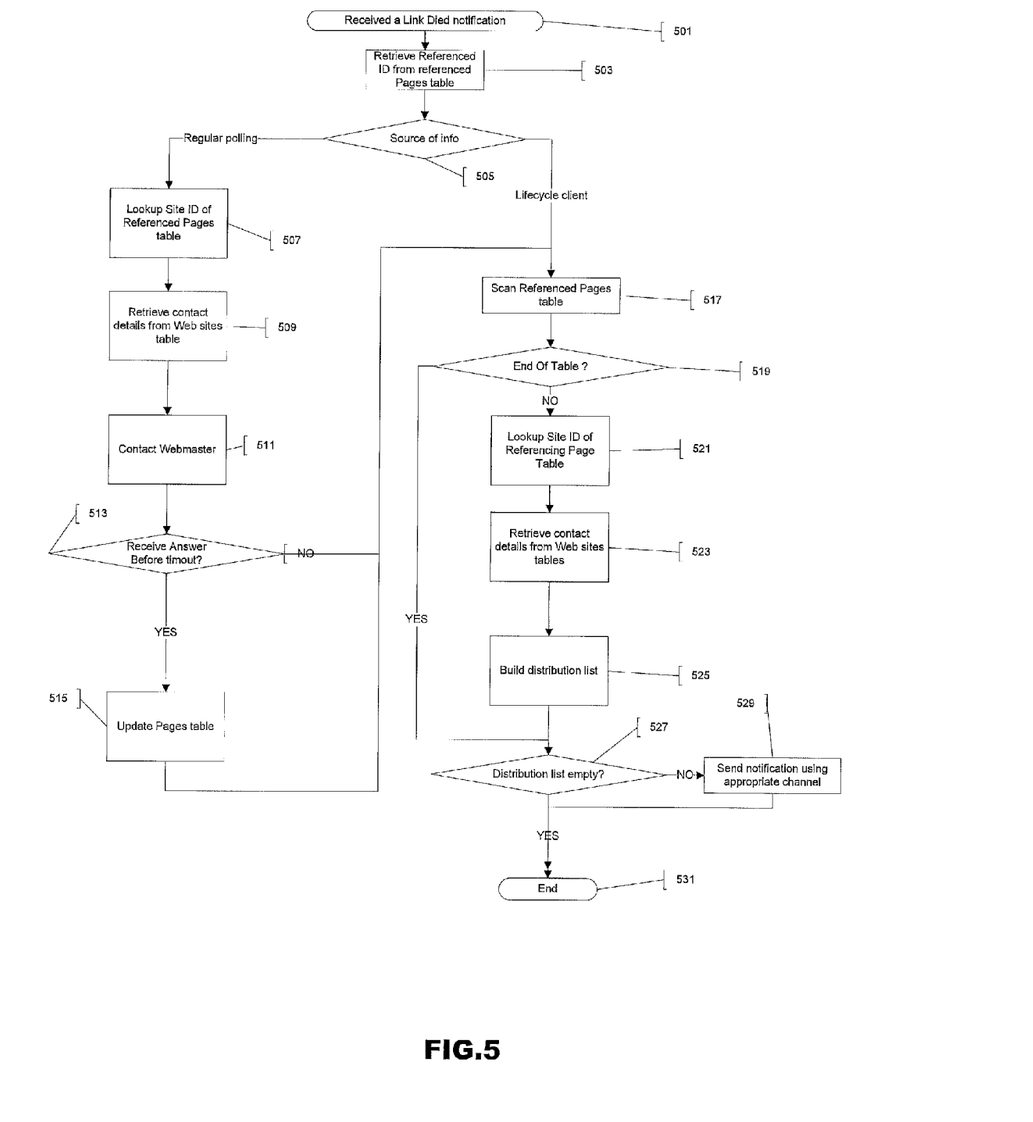
FIG. 5 is a flow chart detailing an illustrative process for processing a broken link event according to an embodiment.

FIG. 5 shows a flow chart 500 for processing a broken or modified link event according to an embodiment of the present invention. The process starts at step 501 when a broken or modified link event is detected. The detection may happen by means of pro-active communication of a web page deletion by a lifecycle client 101 co-residing with a referenced web server 110. Alternatively, the detection of a broken link can come from a regular polling routine from the web pages lifecycle manager 120 checking the availability of the referenced web pages; in this case, the broken link event may be in the form of a 404 HTTP error message.

Next step 503 aims to establish how the broken link event was issued by retrieving the Referenced-ID within the referenced pages table 220.

At step 505, a check identifies the source of the broken link event. If the event detected is issued from a lifecycle client 101 of a referenced web server 110 (Branch Lifecycle Client), the process continues with step 517 further described below.

If the event detected is the result of a polling operation (Branch Regular Polling), the process continues with step 507 to run several steps allowing the webmaster of the unavailable page to be contacted for additional information, such as for example determining a new web page URL to replace the unavailable URL. To this extent, at step 507, the contact routine is started with a look up of the Site_ID 222 in the referenced pages table 220. Using the Site_ID as a key to access the web sites table 200, the process continues at step 509 to look up the associated contact details 202.

Next at step 511, using the contact details, the process allows contacting the webmaster of the referenced site. The contact may take the form of an E-mail asking for confirmation of the deletion and other information, like a possible replacement URL for the missing web page.

At step 513, after a response from the webmaster is received (branch Yes) the process continues with step 515, otherwise if no response is received after timing out (branch No) the process goes to step 517. At step 515, the referencing pages table 210 and the referenced pages table 220 are updated with the additional information received from the webmaster.

Going next to step 517, either from the contact routine or from step 505 directly, a process for notifying all lifecycle clients 101 impacted by the broken link starts. A scan of the referenced pages table 220 is done for retrieving all referencing pages (Page_ID) 223 listed under the Referenced_ID 221 of the unavailable page. The scan iterates until the End Of Table (EOT) is reached at step 519. When the EOT is reached (branch Yes) the process goes to step 527, otherwise, until the EOT is not reached (branch No), the process continues with step 521.

At step 521, the process looks up the referencing page table 210 for retrieving the Site_ID 212 from the Page_ID 211 and uses the found Site_ID to retrieve the associated contact details 202 from the web sites table 200 at next step 523.

The process continues at step 525, adding the contact details (e.g., e-mail address, text message destination number, or other means) to a dynamically built distribution list.

Next, at step 527, a test is performed to check the end of the list. Step 527 checks if the list that is built dynamically is empty. If the dynamically built distribution list is empty (Branch Yes) the process ends on step 531. If the dynamically build distribution list is not empty (Branch No), a notification is sent at step 529 to the human interfaces defined for the webmasters of the referencing web servers 100. The process ends at step 531.

The present invention may be embodied as a method, system or computer program product. Accordingly, the present invention can take the form of an entirely hardware embodiment, an entirely software embodiment (including firmware, resident software, micro-code, etc.) or an embodiment containing both hardware and software elements.

Furthermore, the invention can take the form of a computer program product accessible from a computer-usable or computer-readable medium providing program code for use by, or in connection with a computer system or any instruction execution system. For the purposes of this description, a computer-usable or computer-readable medium can be any tangible (e.g., non-transitory) apparatus that can contain, store, communicate, propagate, or transport the program for use by, or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, or a magnetic storage device. Transmission media can include an electrical connection having one or more wires, an optical fiber, an optical storage device, and a defined segment of the electromagnet spectrum through which digitally encoded content is wirelessly conveyed using a carrier wave.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment, various changes in form and detail may be made therein without departing from the spirit, and scope of the invention.

We claim:

1. In a computer network, a method of managing web page links, the computer network including: a lifecycle managing server that maintains a database, the database including a table of referencing web pages, a table of referenced web pages, and a table of web sites; and a plurality of web servers, each of the plurality of web servers operating a lifecycle client; the method comprising:
    upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page;
    using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link;
    using each retrieved identifier of the web page for automatically identifying, by the lifecycle managing server, from the table of web sites in the database of the lifecycle managing server, one or more web site identifiers; and
    generating and automatically sending, by the lifecycle managing server, a broken link notification for each retrieved web site identifier to all of the lifecycle clients of the plurality of web servers in the computer network.

2. The method of claim 1, further comprising, before the broken link event detection:
    receiving, by the lifecycle managing server, a web site registration request from the lifecycle client of one of the plurality of web servers in the computer network;
    generating, by the lifecycle managing server, a web site identifier for at least one web site, wherein the web site identifier points to web site information stored within the table of web sites in the database of the lifecycle managing server.

3. The method of claim 1, further comprising:
    receiving, by the lifecycle managing server, a web page registration request for the web page from the lifecycle client of one of the plurality of web servers in the computer network; and
    generating, by the lifecycle managing server, a referenced identifier for the web page within the table of referenced web pages in the database of the lifecycle managing server, wherein the referenced identifier is further associated with a web site identifier.

4. The method of claim 2, wherein the web site information comprises webmaster contact information and web site URL.

5. The method of claim 1, wherein the broken link notification generating further comprises:
    retrieving, by the lifecycle managing server, from the table of web sites in the database of the lifecycle managing server, associated webmaster contact and URL web site information for each web site identifier.

6. The method of claim 1, further comprising:
    receiving a web page link modification request from the lifecycle client of one of the plurality of web servers in the computer network;
    determining whether the web page referenced in the web page link modification is registered within the table of referenced web pages in the database of the lifecycle managing server; and
    in the case that the web page referenced in the web page link modification is registered within the table of referenced web pages in the database of the lifecycle managing server, updating the one or more web pages imbedding the modified link within the table of referencing web pages in the database of the lifecycle managing server.

7. The method of claim 1, wherein the referenced identifier is a primary key of the table of referenced web page in the database of the lifecycle managing server, the page identifier is a primary key of the table of referencing web pages in the database of the lifecycle managing server, and the site identifier is a primary key of the table of web site in the database of the lifecycle managing server.

8. The method of claim 1, wherein the broken link event is a 404 HTTP error message issued from the lifecycle client of one of the plurality of web servers in the computer network.

9. A system, comprising:
at least one computing device configured to manage web page links in a computer network, the computer network including: a lifecycle managing server that maintains a database, the database including a table of referencing web pages, a table of referenced web pages, and a table of web sites; and a plurality of web servers, each of the plurality of web servers operating a lifecycle client, by performing actions including:
upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page;
using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link;
using each retrieved identifier of the web page for automatically identifying, by the lifecycle managing server, from the table of web sites in the database of the lifecycle managing server, one or more web site identifiers; and
generating and automatically sending, by the lifecycle managing server, a broken link notification for each retrieved web site identifier to all of the lifecycle clients of the plurality of web servers in the computer network.

10. The system of claim 9, the actions further comprising, before the broken link event detection:
receiving, by the lifecycle managing server, a web site registration request from a web client of the computer network the lifecycle client of one of the plurality of web servers in the computer network; and
generating, by the lifecycle managing server, a web site identifier for the web site, wherein the web site identifier points to web site information stored within the database table of web sites in the database of the lifecycle managing server.

11. The system of claim 9, the actions further comprising:
receiving, by the lifecycle managing server, a web page registration request for the web page from the lifecycle client of one of the plurality of web servers in the computer network; and
generating, by the lifecycle managing server, a referenced identifier for the web page within the table of referenced web pages in the database of the lifecycle managing server, wherein the referenced identifier is further associated with a web site identifier.

12. The system of claim 10, wherein the web site information comprises webmaster contact information and web site URL.

13. The system of claim 9, wherein the broken link notification generating further comprises:
retrieving, by the lifecycle managing server, from the table of web sites in the database of the lifecycle managing server, associated webmaster contact and URL web site information for each web site identifier.

14. The system of claim 9, the actions further comprising:
receiving a web page link modification request from the lifecycle client of one of the plurality of web servers in the computer network;
determining whether the web page referenced in the web page link modification is registered within the table of referenced web pages in the database of the lifecycle managing server; and
in the case that the web page referenced in the web page link modification is registered within the table of referenced web pages in the database of the lifecycle managing server, updating the one or more web pages imbedding the modified link within the table of referencing web pages in the database of the lifecycle managing server.

15. The system of claim 9, wherein the referenced identifier is a primary key of the table of referenced web page in the database of the lifecycle managing server, the page identifier is a primary key of the table of referencing web pages in the database of the lifecycle managing server, and the site identifier is a primary key of the table of web site in the database of the lifecycle managing server.

16. The system of claim 9, wherein the broken link event is a 404 HTTP error message issued from the lifecycle client of one of the plurality of web servers in the computer network.

17. A computer program product stored on a non-transitory computer readable medium, which when executed by a computing device, manages web page links in a computer network, the computer network including: a lifecycle managing server that maintains a database, the database including a table of referencing web pages, a table of referenced web pages, and a table of web sites; and a plurality of web servers, each of the plurality of web servers operating a lifecycle client, by performing actions including:
upon detecting, by the lifecycle client operating on a given one of the plurality of web servers, a broken link event to reach a web page provided by the given web server, the lifecycle client operating on the given web server automatically notifying the lifecycle managing server of the broken link event, and upon detecting, by the lifecycle client, the broken link event, retrieving, by the lifecycle managing server from the table of referenced web pages in the database of the lifecycle managing server, a referenced identifier of the web page;
using the retrieved referenced identifier of the web page for automatically identifying, by the lifecycle managing server, from the table of referencing web pages in the database of the lifecycle managing server, zero or more page identifiers, the zero or more page identifiers identifying zero or more web pages imbedding the broken link;
using each retrieved identifier of the web page for automatically identifying, by the lifecycle managing server, from the table of web sites in the database of the lifecycle managing server, one or more web site identifiers; and generating and automatically sending, by the lifecycle managing server, a broken link notification for each retrieved web site identifier to all of the lifecycle clients of the plurality of web servers in the computer network.

18. The computer program product of claim 17, wherein the actions further comprise:

A) receiving, by the lifecycle managing server, a web site registration request from the lifecycle client of one of the plurality of web servers in the computer network; and generating, by the lifecycle managing server, a web site identifier for the web site, wherein the web site identifier points to web site information stored within the table of web sites in the database of the lifecycle managing server; and B) receiving, by the lifecycle managing server, a web page registration request for the web page from the lifecycle client of one of the plurality of web servers in the computer network; and generating, by the lifecycle managing server, a referenced identifier for the web page within the table of referenced web pages in the database of the lifecycle managing server, wherein the referenced identifier is further associated with a web site identifier.

19. The computer program product of claim 17, wherein the actions further comprise:

receiving a web page link modification request from the lifecycle client of one of the plurality of web servers in the computer network;

determining whether the web page referenced in the web page link modification is registered within the table of referenced web pages in the database of the lifecycle managing server; and in the case that the web page referenced in the web page link modification is registered within the table of referenced web pages in the database of the lifecycle managing server, updating the one or more web pages imbedding the modified link within the table of referencing web pages in the database of the lifecycle managing server.

20. The computer program product of claim 17, wherein the referenced identifier is a primary key of the table of referenced web page in the database of the lifecycle managing server, the page identifier is a primary key of the table of referencing web pages in the database of the lifecycle managing server, and the site identifier is a primary key of the table of web site in the database of the lifecycle managing server.

* * * * *